US008271278B2

(12) United States Patent
Chaudhari et al.

(10) Patent No.: US 8,271,278 B2
(45) Date of Patent: *Sep. 18, 2012

(54) QUANTIZING FEATURE VECTORS IN DECISION-MAKING APPLICATIONS

(75) Inventors: Upendra V. Chaudhari, Briarcliff Manor, NY (US); Hsin I. Tseng, Los Angeles, CA (US); Deepak S. Turaga, Elmsford, NY (US); Olivier Verscheure, Frameries (BE)

(73) Assignee: International Business Machines Corporation, Armonk, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 12/753,859

(22) Filed: Apr. 3, 2010

(65) Prior Publication Data
US 2010/0191531 A1 Jul. 29, 2010

Related U.S. Application Data

(63) Continuation of application No. 11/383,199, filed on May 13, 2006, now Pat. No. 7,769,583.

(51) Int. Cl.
| | |
|---|---|
| *G10L 19/00* | (2006.01) |
| *G10L 19/02* | (2006.01) |
| *G10L 17/00* | (2006.01) |
| *G10L 21/04* | (2006.01) |
| *G10L 11/00* | (2006.01) |
| *G10L 19/12* | (2006.01) |
| *H04M 1/64* | (2006.01) |

(52) U.S. Cl. ........ 704/230; 704/229; 704/246; 704/247; 704/248; 704/249; 704/250; 704/500; 704/503; 704/200; 704/222; 379/88.01; 379/88.02

(58) Field of Classification Search .......... 704/246–250, 704/230, 229, 222, 500, 503, 200; 379/88.01, 379/88.02
See application file for complete search history.

(56) References Cited

U.S. PATENT DOCUMENTS

| | | | | |
|---|---|---|---|---|
| 5,339,385 | A * | 8/1994 | Higgins | 704/246 |
| 5,473,726 | A * | 12/1995 | Marshall | 704/231 |
| 5,687,287 | A * | 11/1997 | Gandhi et al. | 704/247 |
| 5,950,157 | A * | 9/1999 | Heck et al. | 704/234 |
| 5,995,927 | A * | 11/1999 | Li | 704/246 |
| 6,182,037 | B1 * | 1/2001 | Maes | 704/247 |
| 6,253,179 | B1 * | 6/2001 | Beigi et al. | 704/243 |
| 6,330,536 | B1 * | 12/2001 | Parthasarathy et al. | 704/249 |

(Continued)

OTHER PUBLICATIONS

Pelecanos, J.; Myers, S.; Sridharan, S.; Chandran, V.; , "Vector quantization based Gaussian modeling for speaker verification," Pattern Recognition, 2000. Proceedings. 15th International Conference on , vol. 3, no., pp. 294-297 vol. 3, 2000.*

(Continued)

*Primary Examiner* — Paras Shah
(74) *Attorney, Agent, or Firm* — Ido Tuchman; Anne V. Dougherty (57) ABSTRACT

A system, method and computer program product for classification of an analog electrical signal using statistical models of training data. A technique is described to quantize the analog electrical signal in a manner which maximizes the compression of the signal while simultaneously minimizing the diminution in the ability to classify the compressed signal. These goals are achieved by utilizing a quantizer designed to minimize the loss in a power of the log-likelihood ratio. A further technique is described to enhance the quantization process by optimally allocating a number of bits for each dimension of the quantized feature vector subject to a maximum number of bits available across all dimensions.

20 Claims, 6 Drawing Sheets

U.S. PATENT DOCUMENTS

| | | | |
|---|---|---|---|
| 6,360,204 B1* | 3/2002 | Li et al. | 704/500 |
| 6,411,930 B1* | 6/2002 | Burges | 704/240 |
| 6,697,778 B1* | 2/2004 | Kuhn et al. | 704/243 |
| 6,922,668 B1* | 7/2005 | Downey | 704/246 |
| 7,272,557 B2* | 9/2007 | Odell | 704/230 |
| 7,295,978 B1* | 11/2007 | Schwartz et al. | 704/240 |
| 7,315,819 B2* | 1/2008 | Toguri et al. | 704/246 |
| 7,318,032 B1* | 1/2008 | Chaudhari et al. | 704/254 |
| 7,379,868 B2* | 5/2008 | Reynolds | 704/243 |
| 7,454,339 B2* | 11/2008 | Liu et al. | 704/250 |
| 2003/0046072 A1* | 3/2003 | Ramaswamy et al. | 704/240 |
| 2004/0049384 A1* | 3/2004 | Subramaniam et al. | 704/230 |
| 2005/0021335 A1* | 1/2005 | Chaudhari et al. | 704/243 |

OTHER PUBLICATIONS

Stephen So, Kuldip K. Paliwal, Scalable distributed speech recognition using Gaussian mixture model-based block quantisation, Speech Communication, vol. 48, Issue 6, Jun. 2006, pp. 746-758, ISSN 0167-6393, 10.1016/j.specom.2005.10.002. Available Online Nov. 2005.*

* cited by examiner

QUANTIZING FEATURE VECTORS IN DECISION-MAKING APPLICATIONS

GOVERNMENT LICENSE RIGHTS

This invention was made with U.S. Government support under Agreement No. HR0011-07-9-0002 awarded by DARPA. The U.S. Government has certain rights in the invention.

CROSS-REFERENCE TO RELATED APPLICATIONS

This application claims priority under 35 U.S.C. §120 to U.S. patent application Ser. No. 11/383,199 filed May 13, 2006, the entire text of which is specifically incorporated by reference herein.

FIELD OF THE INVENTION

The present invention relates generally to decision-making applications, and more specifically, verification systems that use statistical models.

BACKGROUND

Mobile devices, such as cellular telephones, are rapidly growing in prevalence. As such, users are beginning to expect not only communication from mobile devices, but a wide variety of computational services as well. To facilitate this wider variety of services, it is often beneficial to be able to determine the identity of a speaker based on that person's voice. Making this determination is known in the art as speaker verification. Speaker verification is possible because the patterns of acoustical energy which constitute human speech vary from person to person.

Speaker verification offers many benefits to the user interface of mobile devices. Speaker verification may allow authenticating users for access to computational services offered via mobile devices. It can also be used to personalize the user experience for the specific individual accessing the service. It is noted that speaker verification also may enhance systems other than mobile devices. Broadly speaking, speech-based interfaces are suitable for a wide variety of access and operational requirements. Speaker verification enhances any speech-based interface, thus helping adapt systems with traditional user interfaces to work well under unusual operational requirements. For example, a speech-based interface with speaker verification may facilitate a human who does not have full use of his hands in using a computer system normally operated via a keyboard and mouse. Furthermore, speaker verification may be used to accomplish biometric authentication on any type of system regardless of its user interface.

SUMMARY OF THE INVENTION

One exemplary aspect of the present invention is a method for classification of an analog electrical signal using statistical models of training data. In this method, an analog electrical signal is converted into a sequence of multi-dimensional feature vectors. The feature vectors are quantized on a relevant subspace of a first statistical model as a function of a second statistical model. A likelihood ratio is determined by dividing the likelihood that the quantized feature vector belongs to the second statistical model by the likelihood that the quantized feature vector belongs to the first statistical model. The logarithm of the likelihood ratio is computed. The analog electrical signal is classified as belonging to the second statistical model if the average of the logarithms of likelihood ratios exceeds a predefined classification threshold.

Another exemplary aspect of the present invention is a system for classification of an analog electrical signal using statistical models of training data. In this system, an extraction unit is configured to convert an analog electrical signal into a sequence of multi-dimensional feature vectors. A scoring unit is configured to determine a relevant subspace from a first statistical model based on maximum likelihood that the subspace accurately represents the feature vector. A quantizing unit is configured to quantize the feature vector according to the relevant subspace and a bit allocation strategy vector specifying the number of bits to be allocated for each dimension. A calculating unit is configured to compute the likelihood ratio by dividing the likelihood that the quantized feature vector belongs to a second statistical model by the likelihood that the quantized feature vector belongs to the first statistical model. The calculating unit further computes the logarithm of the likelihood ratio. A determining unit is configured to average the logarithms of the likelihood ratios of a predetermined number of frames and to further determine whether the resulting average exceeds a predefined classification threshold. A bit allocation unit is configured to determine the bit allocation strategy vector by minimizing a LaGrangian cost function.

Yet a further exemplary aspect of the invention is a computer program product. The computer program product includes computer readable program codes configured to cause the program to: convert an analog electrical signal into a sequence of multi-dimensional feature vectors; quantize a feature vector on a relevant subspace of a first statistical model as a function of a second statistical model; determine a likelihood ratio by dividing the likelihood that the quantized feature vector belongs to the second statistical model by the likelihood that the quantized feature vector belongs to the first statistical model; compute the logarithm of the likelihood ratio; average a series of log-likelihood ratios; and classify the analog electrical signal as belonging to the second statistical model if the average of the logarithms of likelihood ratios exceeds a predefined classification threshold.

The foregoing and other features, utilities and advantages of the invention will be apparent from the following more particular description of various embodiments of the invention as illustrated in the accompanying drawings.

DETAILED DESCRIPTION OF THE INVENTION

The following description details how the present invention is employed to classify an analog electrical signal using statistical models of training data. Other applications of the present invention utilizing the general principles set forth herein are also contemplated. Thus, the present invention should not be considered limited to the configurations shown and discussed herein. Throughout the description of the invention reference is made to FIGS. 1-6. When referring to the figures, like structures and elements shown throughout are indicated with like reference numerals.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Figure 1:
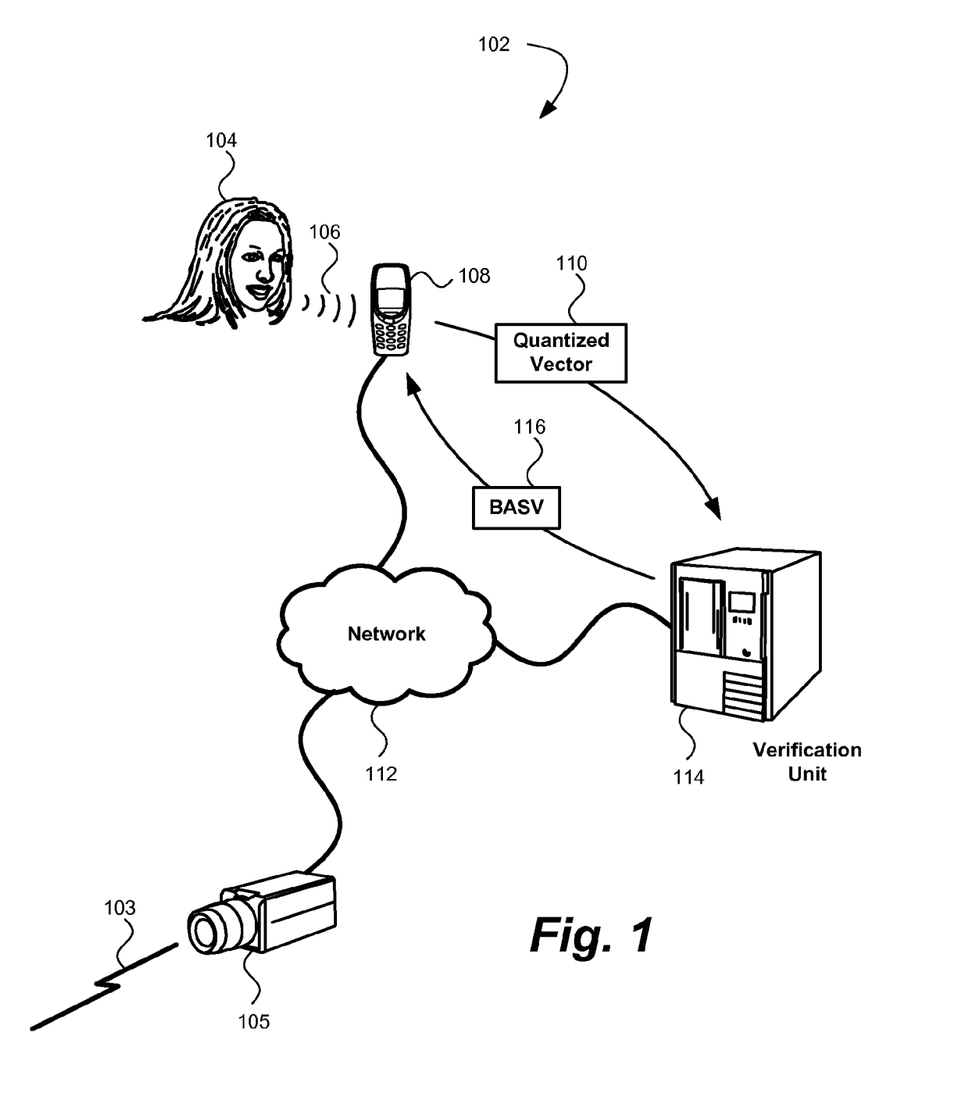
FIG. 1 shows an exemplary system for distributed speaker verification, the system embodying the present invention.

FIG. 1 shows an exemplary identification system 102 embodying the present invention. The system 102 includes a speaker 104. A goal of the system may be to verify the identity of the speaker 104. This verification need not depend on a standard of absolute certainty. Rather, it may instead be based on statistical techniques that determine whether the identity of the speaker is known with a desired probability. Authenticating the speaker's identity may be a prerequisite to allowing the speaker access to other functionality offered by the system. It is contemplated that the speaker 104 is a human being, as the present invention capitalizes on the differences in speech patterns between human beings to distinguish between the humans themselves. However, this is not a prerequisite of the present invention.

The speaker 104 emits acoustical energy 106 (e.g., sound.) It is emphasized that while the exemplary system is based on acoustical energy, the present invention can be used to classify various real events using statistical modeling. For example, the present invention may be utilized to analyze optical energy 103 (e.g., light) using a optical transducer 105 in order to perform face recognition, a biometric technique to verify a human's identity based on the unique characteristics of his or her face. The present invention may also be utilized to analyze optical energy 103 to perform optical character recognition, a technique to determine the identity of characters in a character set based upon their shapes.

The energy 106 is received by a front-end unit 108. The front-end unit may be any technological device suitable for receiving and processing energy. For example, the front-end unit may be a smart phone. The front-end unit may also be a peripheral device capable of receiving the energy, coupled to a computer system capable of processing the energy.

Broadly speaking, the front-end unit 108 is responsible for converting the energy 106 into a compressed format suitable for analysis to determine the identity of the speaker 104. The front-end unit 108 may additionally perform other administrative functions. The front-end unit 108 can incorporate a transducer (such as a microphone) to convert the energy into an analog electrical signal. Once the acoustic energy is converted into electrical energy, a series of frames are generated, with each frame measuring the signal over a specific time interval. As discussed in more detail below, the front-end unit 108 converts each frame into a feature vector. Each feature vector is a multi-dimensional set of values representing the characteristics of the frame. The front-end unit then quantizes the feature vectors. Quantization is a type of compression designed to beneficially maximize the degree of compression of the feature vector while minimizing the degree of diminution in the ability to verify the speaker.

The front-end unit transmits the quantized feature vectors 110 to the speaker verification unit 114. This transmission may be effected by a network 112. The network may be any of various types known in the art, including by example and without limitation TCP/IP, GSM®, Wi-Fi®, Bluetooth® piconets, token ring and microwave. GSM is a registered trademark of the GSM Association, London, United Kingdom. Wi-Fi is a registered trademark of the Wi-Fi Alliance, Austin, Tex., United States. Bluetooth is a registered trademark of Bluetooth SIG, Inc., Bellevue, Wash., United States. It is noted that the network 112 may be wireless and may be part of the broader global telecommunications network.

The speaker verification unit 114 receives the quantized feature vectors 110. As discussed in detail below, for each quantized feature vector 110, a ratio is computed between the probability that the feature vector 110 belongs to a speaker under consideration and the probability that it belongs to the Universal Background Model (UBM). The UBM is a representation of a typical, average speaker, designed to have as few idiosyncrasies as possible. The resulting ratio is known as the likelihood ratio. The logarithm of this value is taken; the resulting value is known as the log-likelihood ratio. The resulting values are averaged for a predetermined number of feature vectors. This average may be compared to a threshold value. If the average exceeds the threshold, the speaker verification unit 114 classifies the quantized feature vectors as belonging to the speaker 104. The system 102 can be configured to simultaneously consider multiple potential speakers as possible identities of the actual speaker 104. In this case, the average of the log-likelihood ratio may be calculated and compared separately for each speaker under consideration.

The speaker verification unit 114 transmits directives to the front-end unit 108 concerning more efficient and/or more appropriate ways to perform the quantization process. Such directives may be transmitted via the network 110. In particular, the speaker verification unit 114 may provide a special directive known as the bit allocation strategy vector (BASV) 116. As discussed in detail below, the BASV 116 is a direct input to the quantization process. It improves the quantization process by specifying an optimal manner of quantizing the feature vectors.

It is noted that the speaker verification unit 114 may be responsible for verifying speakers for a large number (possibly thousands) of front-end units 108. Moreover, the network 110 may have limited bandwidth, particularly if it is part of, or implemented via, the broader telecommunications system. Quantization of the feature vectors is beneficial because reducing the size of the feature vectors significantly reduces both the load on the speaker verification unit and the required network bandwidth, thus improving these potential bottlenecks in the system.

Figure 2:
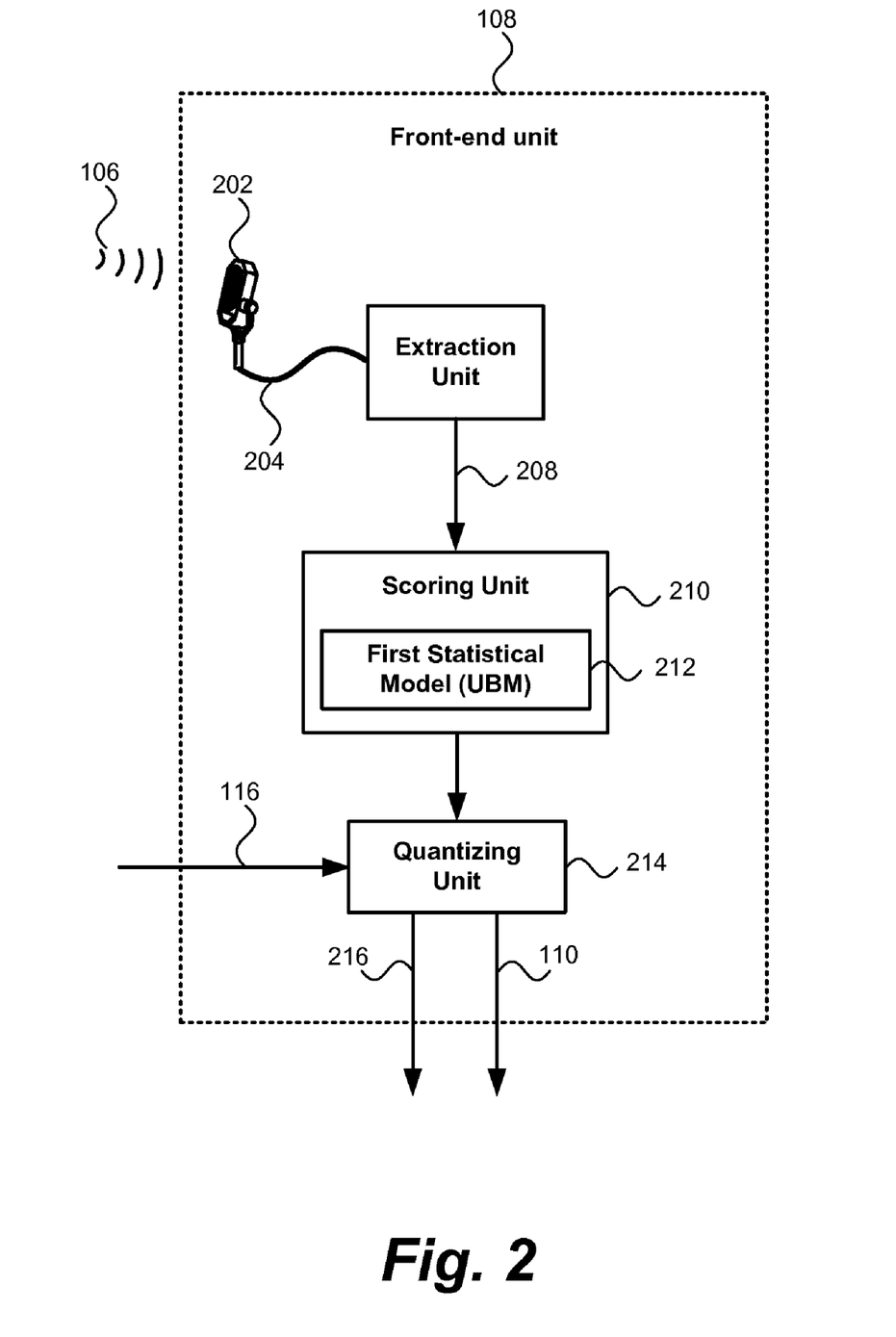
FIG. 2 demonstrates an exemplary configuration of a front-end unit.

Turning now to FIG. 2, an exemplary configuration of a front-end unit 108 is illustrated. The configuration shown is used to demonstrate the operation of the present invention. Energy 106 is received at the front-end unit 108 by a transducer 202. As previously noted, the present invention can process a wide variety of types of energy. In a further embodiment of the present invention, the energy is acoustical energy, and the transducer is an acoustical transducer. In another further embodiment of the present invention, the energy is optical energy, and the transducer is an optical transducer. The transducer converts the energy into an analog electrical signal 204.

The analog electrical signal 204 is received by the extraction unit 206. The extraction unit 206 may convert the signal into speech frames. A frame is a sample of incoming speech data over a specific time interval. Frames may, for example, be sampled at intervals of 10 milliseconds each. It is noted that in some embodiments of the present invention, frames may overlap.

The extraction unit 206 may further extract specific data from each input speech frame in order to generate a multi-dimensional feature vector 208. Feature vectors may be implemented as vectors of scalar values. Each scalar value is referred to as a dimension. The dimensions may be floating-point numbers and may each be 32 bits in length. In an embodiment of the present invention, Mel-frequency cepstral coefficients (MFCC's) are extracted from the input speech frames. Each MFCC may be represented via a single dimension. See G. N. Ramaswamy, J. Navratil, U. V. Chaudhari and R. D. Zilca, "The IBM System for the NIST 2002 Cellular Speaker Verification Evaluation," in *IEEE ICASSP*, Hong Kong, April 2003, incorporated herein in its entirety by reference. The logarithmic energy of the input speech frame may also be extracted into a single dimension. The first derivatives and even the second derivatives of any of the preceding measurements may be taken, with each such derivative itself possibly constituting another dimension. It is emphasized that the measurements which may be used as dimensions of the feature vector are not limited to those discussed here. As an example of types of data typically extracted from input speech frames, the ETSI Aurora, a state-of-the-art digital speech recognition system, extracts 13 MFCC's and the logarithmic energy from each input speech frame. See ETSI ES 201 108 V1.2.2, "Speech Processing, Transmission and Quality Aspects (stq); Distributed Speech Recognition; Front-End Feature Extraction Algorithm; Compression Algorithms," Tech Rep., ETSI, 2000, incorporated herein in its entirety by reference.

The multi-dimensional feature vector 208 may be transmitted to a scoring unit 210. The scoring unit 210 may use statistical techniques to determine the nature of the feature vector. Specifically, diagonal-covariance Gaussian Mixture Models (GMM's) may be used to generate mathematical functions which determine the probability that a particular feature vector 208 represents a particular speaker. Such functions are referred to as likelihood functions.

In a particular embodiment of the invention a first statistical model, which may be based on GMM's, is known as the Universal Background Model (UBM) is used. The UBM is intended to represent a typical, average speaker. It may be designed to have as few idiosyncrasies as possible, and may in fact be trained based upon an average of many different real-life speakers. It is noted that the UBM may be considered as a single speaker for purposes of the likelihood functions, even if it is in reality a composite of numerous speakers. A second statistical model, which may also be based on GMM's, is used to model a given speaker. This second model may be generated by Bayesian adaptation of the UBM.

In an embodiment of the present invention, the mean vectors of the second statistical model are derived from the first speaker model via MAP adaptation based on speaker-specific training data. It is contemplated that the weights of each speaker and the diagonal covariance matrices are identical between the two statistical models. See D. A. Reynolds and T. F. Quatieri and R. B. Dunn, "Speaker Verification using Adapted Gaussian Mixture Models," *Digital Signal Processing*, vol. 10, no. 1-3, 2000, incorporated herein in its entirety by reference.

The scoring unit 210 may incorporate a copy of the first statistical model 212, the UBM. The scoring unit 210 determines which subspace of the UBM has the highest probability of having generated the multi-dimensional feature vector 208. This subspace may be a single Gaussian element of a Gaussian Mixture Model. It is contemplated that the selected subspace will have the same number of dimensions as the feature vectors. It is noted that each Gaussian element of a GMM can have an index which uniquely identifies it. As will be discussed in more detail below, the speaker verification unit (item 114 of FIG. 1) can include an independent but identical copy of the UBM. In this case, the identity of the selected subspace can be accurately communicated using the index alone.

The multi-dimensional feature vector 208 and the index of the selected subspace may be transmitted to a quantizing unit 214. The quantizing unit 214 may quantize the feature vector 208 based on the selected subspace. Quantization is a compression process which may reduce the number of bits with which a given dimension of the feature vector is expressed. Each possible value of the original dimension may map to a determinate quantized value. Conversely, each possible value which can be expressed using the number of bits allocated to the reduced dimension may represent a range of possible values of the original dimension. It is noted that a higher number of bits allows for greater accuracy because more possible values can be represented. The number of values which can be represented is $2^b$, where b is the number of bits in which the dimension is represented.

In an embodiment of the present invention, a dimension may be represented using zero bits, which is to say it is omitted entirely from the quantized feature vector. This may be beneficial if the dimension is of minimal importance in verifying a particular speaker. Conversely, in another embodiment of the present invention, a dimension of the quantized feature vector may contain the same number of bits as the original feature vector (the dimension is not compressed). However, it is contemplated that in practice, this extreme case is unlikely. Indeed, it is contemplated that quantization will significantly reduce the number of bits of any given dimension of the feature vector.

The goal of quantization is not merely to perform a simple rounding operation, but rather to encode the data in a manner which minimizes the average distortion of the data. The quantizing unit 214 may thus iteratively compute encoder partitions based on a nearest neighbor condition. The resulting partitions are intended to be reconstructed at the speaker verification unit according to the centroid condition.

The total number of bits in which the quantized feature vector is represented may be predefined. A bit allocation strategy vector (BASV) 116 may be used to reallocate the number of bits used by each dimension of the feature vector, subject to this maximum. The quantizing unit 214 may receive an initial BASV and may quantize subsequently received feature vectors 208 so that each dimension is represented using the number of bits specified by the BASV 116. It is noted that the optimal BASV depends on the set of speakers under consideration. Thus, in an embodiment of the present invention, the quantizing unit may receive an updated BASV 116 at any time. Feature vectors subsequently received may be quantized according to the updated BASV 116.

The quantizing unit 214 performs the quantizing operation in a manner intended to minimize a power of the loss in the log-likelihood ratio between the original feature vector and the quantized feature vector. In an embodiment of the present invention, this power is two. Alternatively, the quantizing operation may be performed using a weighted Mean Squared Error (MSE) quantizer. As is demonstrated below, a weighted MSE quantizer minimizes the loss in the log-likelihood ratio. This is the case whether or not multiple speakers are under consideration.

The quantized feature vectors 110 generated by the quantizing unit 214 are transmitted to the speaker verification unit 114. The index 216 of the selected subspace determined by the scoring unit 210 may be transmitted along with the quantized feature vectors.

Figure 3:
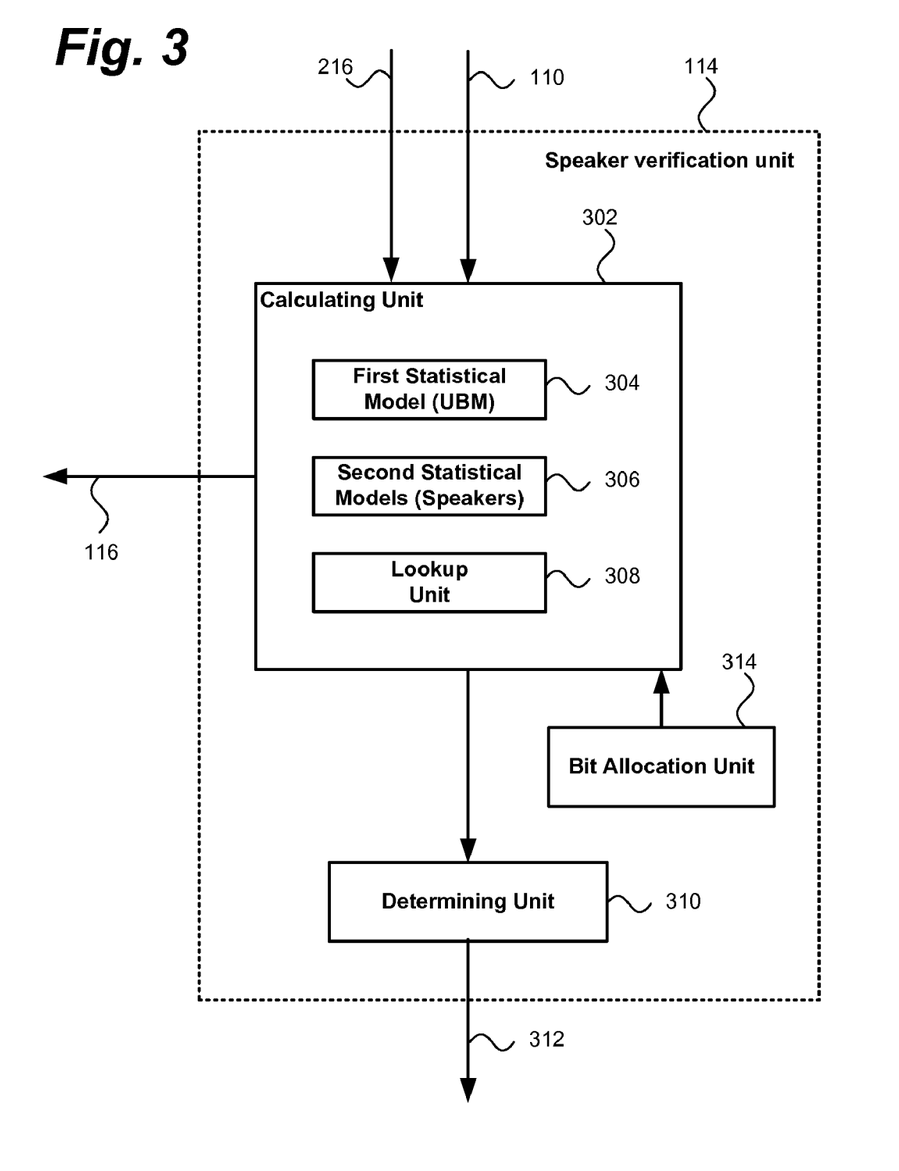
FIG. 3 demonstrates an exemplary configuration of a speaker verification unit.

Turning now to FIG. 3, an exemplary configuration of a speaker verification unit 114 is illustrated. Quantized, multi-dimensional feature vectors 110 and the index of the selected subspace of the first statistical model 216 are received at a calculating unit 302. Broadly speaking, the calculating unit 302 is responsible for performing calculations related to the likelihood that the quantized feature vectors represent one of a set of speakers under consideration. The calculating unit 302 may include a first statistical model 304. As discussed above, the first statistical model 304 may be the Universal Background Model. It is contemplated that this copy of the UBM is identical to that found in the front-end unit (item 108 in FIGS. 1 and 2). The calculating unit 302 may also incorporate second statistical models 306. Each such second statistical model represents a speaker under consideration.

The calculating unit 302 utilizes the likelihood function for the second statistical model 306, along with the selected subspace, to determine the probability that a quantized feature vector represents the speaker. It further utilizes the likelihood function for the first statistical model 304, along with the selected subspace, to determine the probability that the same quantized feature vector represents the background (e.g., a hypothetical average speaker.) The calculating unit 302 divides the figure for the second statistical model by the figure for the first statistical model, yielding a result known as the likelihood ratio. This ratio is relevant because even if a quantized feature vector represents a given speaker with a probability of, for example, 0.6, the speaker verification unit 114 may nonetheless conclude that it does not represent that speaker if it also calculated a probability of 0.8 of representing the background. The calculating unit may further take the logarithm of the likelihood ratio. For brevity, this result may be referred to as the log-likelihood ratio. Furthermore, if more than one potential speaker is under consideration, this process may be repeated for each target speaker.

The calculating unit 302 may consult a lookup unit 308 in lieu of performing the calculations in real time. This beneficially reduces the amount of time required to perform speaker verification. In an embodiment of the present invention, the lookup unit 308 contains precomputed values of the likelihood functions. Determining the log-likelihood ratio thus requires two table lookups, a division operation and a logarithm operation. In another embodiment of the present invention, the lookup unit 308 contains precomputed values of the log-likelihood ratio itself. Determining the log-likelihood ratio thus requires only one table lookup with no further calculation. An implementation of the present invention may thus select whichever embodiment is more appropriate to that implementation's operational constraints.

The calculating unit 302 may transmit the log-likelihood ratios to a determining unit 310. The determining unit 310 receives the ratios and, for each speaker under consideration, averages together the values as they are received. In an embodiment of the present invention, the averaging operation used is the arithmetic mean. In another embodiment of the present invention, the averaging operation used is the geometric mean. The determining unit 310 may continue this process until the values for a predefined number of quantized feature vectors for each speaker under consideration are averaged.

When an average for a given speaker is finally determined, the determining unit 310 may compare it to a predefined classification threshold. Based on this comparison, the determining unit 310 may make a decision 312 as to whether the quantized feature vectors represent a particular speaker under consideration. The decision may be represented by a Boolean value. The decision may be transmitted to the front-end unit 108 or to any other entity with a need to verify the speaker 104.

A bit allocation unit 314 may compute the bit allocation strategy vector (BASV) 116. The optimal BASV and the calculation of the log-likelihood ratios depend on the specific set of speakers under consideration. Therefore, the bit allocation unit may compute the optimal BASV for the initial set of speakers. This computation is performed using LaGrangian optimization. The bit allocation unit may also cause the values in the lookup unit 308 to be precomputed for the initial set of speakers. It may itself perform the appropriate calculations. It may also accomplish this goal by providing directives to the calculating unit 302. The optimal BASV is transmitted to the front-end unit 108 so the quantization operation can be performed in the most optimal manner. Furthermore, whenever the set of speakers under consideration changes, such as when a new speaker is added to consideration or when a speaker is removed from consideration, the preceding steps may be repeated.

Figure 4:
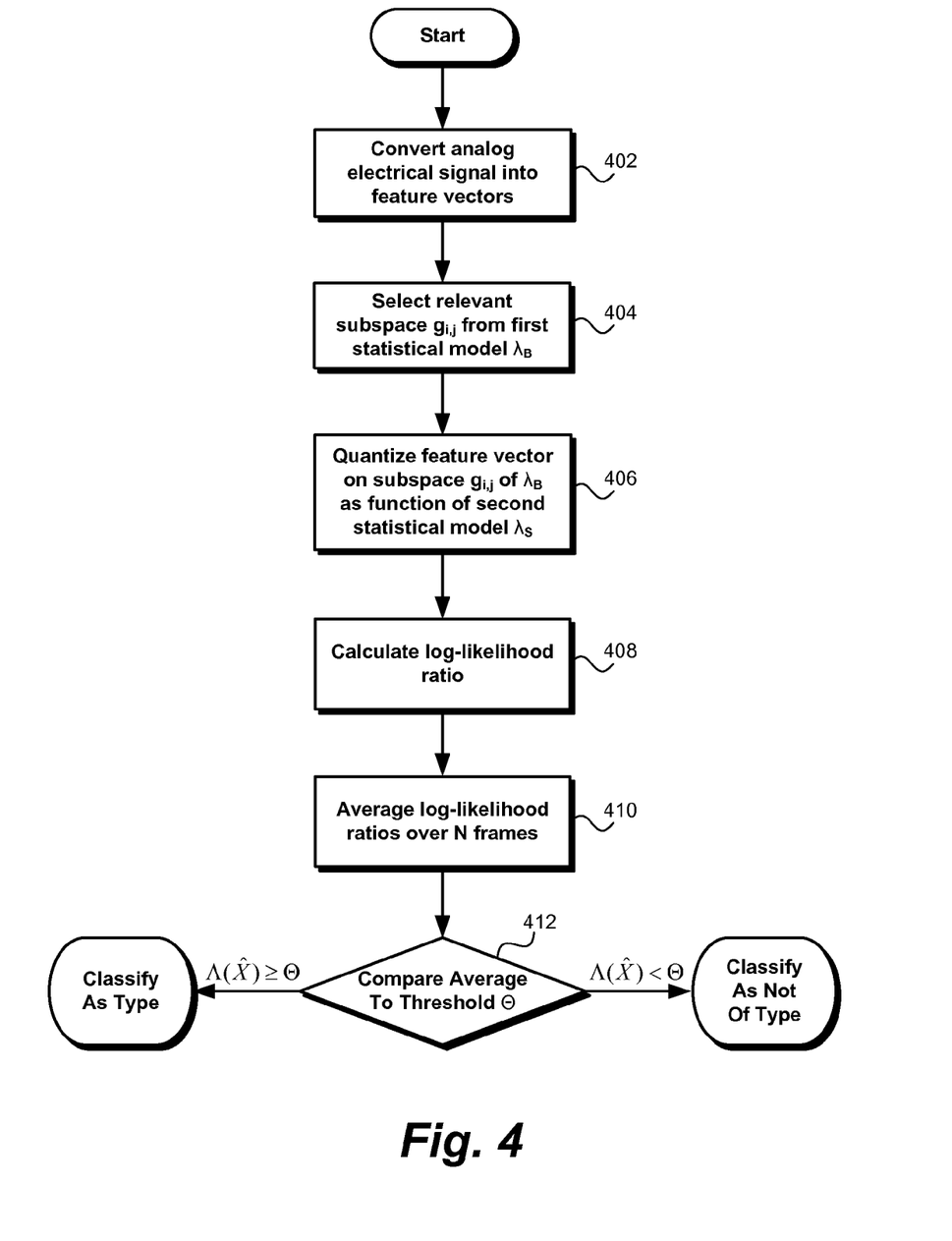
FIG. 4 shows an exemplary flowchart of the operations performed by the present invention to classify an analog electrical signal.

FIG. 4 shows an exemplary flowchart of the operations performed by the present invention to classify an analog electrical signal. It will be understood that each block of the flowchart illustrations, and combinations of blocks in the flowchart, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

At converting operation 402, an incoming analog electrical signal is converted into a sequence of feature vectors. Each such feature vector is multi-dimensional. The original multi-dimensional feature vectors can be expressed as a sequence $X=\{x_i^j\}$. The elements of this sequence are the vectors $x_i$, where i ranges from 1 to N, N being the number of feature vectors in the sequence. It is noted that because each vector $x_i$ is derived from a different input speech frame, the vectors may be considered for purposes of mathematical calculations to be mutually independent. The dimensions of the original feature vector having an index of i are the scalars $x_i^j$, where j ranges from 1 to D, D being the number of dimensions in each feature vectors. See G. N. Ramaswamy, J. Navratil, U. V. Chaudhari and R. D. Zilca, "The IBM System for the NIST 2002 Cellular Speaker Verification Evaluation," in *IEEE ICASSP*, Hong Kong, April 2003, incorporated herein in its entirety by reference. Upon completion of converting operation 402, control passes to scoring operation 404.

At scoring operation 404, a relevant subspace from a first statistical model is selected based on maximum likelihood that the subspace accurately represents the feature vector. The first statistical model is generated from a first training data set. It may be a Gaussian mixture model. It is represented in mathematical equations by $\lambda_B$. The relevant subspace may be a single multi-dimensional Gaussian element in the first statistical model that is the most likely to have generated the multi-dimensional feature vector. The index of the relevant subspace is represented by $g_{i,j}$. After scoring operation 404 is completed, control passes to quantizing operation 406.

At quantizing operation 406, the feature vector generated by the converting operation 402 is quantized on the relevant subspace of the first statistical model as a function of a second statistical model. The second statistical model is generated from a second training data set. It may be a Gaussian mixture model. The second statistical model is represented in mathematical equations by $\lambda_S$. The quantizing operation may be performed according to a bit allocation strategy vector specifying the number of bits to be used for each dimension of the quantized feature vector.

Mathematically, the quantized feature vectors can be expressed as a sequence $\hat{X}=\{\hat{x}_i^j\}$. The elements of this sequence are the vectors $\hat{x}_i$, where i ranges from 1 to N, N being the number of feature vectors in the sequence. The dimensions of the quantized feature vector having an index of i are the scalars $\hat{x}_i^j$, where j ranges from 1 to D, D being the number of dimensions in the feature vector.

The quantizing operation 406 is performed in a manner intended to minimize a power of the loss in the log-likelihood ratio between the original feature vector and the quantized feature vector. In an embodiment of the present invention, the power is two. In this case, the quantizing unit attempts to minimize the following expression:

$$(\Lambda(X)-\Lambda(\hat{X}))^2$$

where $\Lambda(X)$ represents the average of the log-likelihood ratios of the original feature vectors and $\Lambda(\hat{X})$ represents the average of the log-likelihood ratios of the quantized feature vectors.

Suppose that the MAP-adapted mean of the selected Gaussian with index $g_{i,j}$ in the second statistical model $\lambda_S$ can be expressed as $\mu_{Sg_{i,j}}=\mu_{Bg_{i,j}}+\delta_{g_{i,j}}$. Suppose also that the weight coefficients $w_{g_{i,j}}$ and covariance matrices $\Sigma_{g_{i,j}}$ of the first statistical model $\lambda_B$ and the second statistical model $\lambda_S$ are identical. Note also that the elements of the feature vector, of which there are D, are mutually independent. Under these assumptions, the log-likelihood ratio $\Lambda(x_i^j)$ can be expressed using the following equation:

$$\Lambda(x_i^j) = \frac{\delta_{g_{i,j}}}{\sigma_{g_{i,j}}^2}\left[x_i^j - \frac{\mu_{Sg_{i,j}} + \mu_{Bg_{i,j}}}{2}\right] \tag{1}$$

The decision may be made after N feature vectors are processed. In this case, the average log-likelihood ratio $\Lambda(X)$ over the N feature vectors can be expressed with the following equation:

$$\Lambda(X) = \sum_{i=1}^{N}\sum_{j=1}^{D} \frac{\delta_{g_{i,j}}}{\sigma_{g_{i,j}}^2}\left[x_i^j - \frac{\mu_{Sg_{i,j}} + \mu_{Bg_{i,j}}}{2}\right] \tag{2}$$

The elements of a quantized feature vector $\hat{x}_i^j$ be statistically represented by a discrete probability mass function. It can be demonstrated that the probability density function (pdf) can be used to reverse the quantizing process by computing $\Lambda(\hat{x}_i^j)$. This is demonstrated by the following equation:

$$\Lambda(\hat{x}_i^j) = \log\frac{P(\hat{x}_i^j \mid \lambda_S)}{P(\hat{x}_i^j \mid \lambda_B)} \approx \log\frac{P(\hat{x}_i^j \mid \lambda_S)}{P(\hat{x}_i^j \mid \lambda_B)} \tag{3}$$

Thus, the loss in log-likelihood ratio between an unquantized feature vector $x_i$ and its quantized form $\hat{x}_i$ can be expressed using the following formula:

$$L_i = \sum_{j=1}^{D} (\Lambda(x_i^j) - \Lambda(\hat{x}_i^j)) = \sum_{j=1}^{D} \frac{\delta_{g_{i,j}}}{\sigma_{g_{i,j}}^2}(x_i^j - \hat{x}_i^j) \quad (4)$$

It is desirable to minimize the expected value of a power of the loss in the log-likelihood ratio. If the power to be minimized is two, the value we wish to minimize can be expressed as follows:

$$E(L_i^2) = \sum_{j=1}^{D} \sum_{i=1}^{N} w_{g_{i,j}} \frac{\delta_{g_{i,j}}^2}{\sigma_{g_{i,j}}^4} E[(x_i^j - \hat{x}_i^j)^2] +$$

$$\sum_{j=1}^{D} \sum_{k \neq j} \sum_{i=1}^{N} w_{g_{i,j}} \frac{\delta_{g_{i,j}} \delta_{g_{i,k}}}{\sigma_{g_{i,j}}^2 \sigma_{g_{i,k}}^2} E[x_i^j - \hat{x}_i^j] E[x_i^k - \hat{x}_i^k]$$

Generally, the quantization operation does not change the mean. Under this assumption, the second term (after the plus sign) is zero, and the expression can be simplified to:

$$E(L_i^2) = \sum_{j=1}^{D} \sum_{i=1}^{N} w_{g_{i,j}} \frac{\delta_{g_{i,j}}^2}{\sigma_{g_{i,j}}^4} E[(x_i^j - \hat{x}_i^j)^2] \quad (5)$$

It is noted that this expression represents a weighted Mean Squared Error (MSE) quantizer. Thus, the quantizing operation may be performed using a weighted MSE quantizer.

It is contemplated that many systems embodying the present invention will be configured to classify the analog electric signal as one of (or none of) any of a set of candidates. To allow for this possibility, separate log-likelihood ratios may be computed and averaged. The difference in log-likelihood ratio for the candidate m may be expressed as:

$$L^m = \Lambda^m(X) - \Lambda^m(\hat{X})$$

Quantizing the feature vectors for each candidate under consideration is inefficient. Instead, it is desirable to determine a quantizer which minimizes the expected value of a power of the loss in the log-likelihood ratio across all the possible candidates. If the power of the log-likelihood ratio to be minimized is two:

$$E\left[\sum_{m=1}^{M}(L_i^m)^2\right] = M \sum_{j=1}^{D} \sum_{i=1}^{N} w_{g_{i,j}} \frac{\Delta_{g_{i,j}}}{\sigma_{g_{i,j}}^4} E[(x_i^j - \hat{x}_i^j)^2]$$

where M is the total number of candidates under consideration and $$\Delta_{g_{i,j}} = \frac{1}{M} \sum_{m=1}^{M} \delta_{m,g_{i,j}}^2.$$

It is noted that this expression also represents a weighted Mean Squared Error (MSE) quantizer. Thus, the quantizing operation may be performed using a weighted MSE quantizer even when multiple speakers are under consideration.

A bit allocation strategy vector (BASV) is used to determine the number of bits used for each dimension of the quantized feature vector. The total number of bits used across all dimensions of the quantized feature vector may be fixed, while the number of bits per dimension may vary. The BASV is determined by minimizing a LaGrangian cost function subject to the constraint of the received maximum number of bits per feature vector. A cost function is configured to represent the cost of reducing each dimension to a certain number of bits. The cost is defined as the loss of log-likelihood ratio, taken to a predefined power, resulting from quantizing the feature vector so that each dimension has the specified number of bits. In an embodiment of the present invention, the power is two, e.g., the loss in log-likelihood ratio is squared. The total cost is minimized subject to a constraint of a total number of bits in which the quantized feature vectors should be expressed. In an embodiment of the present invention, the total number of bits is predefined.

For a single candidate, the number of bits to be used by a given element $\hat{x}_i^j$ of the quantized feature vectors, given the selected subspace $g_{i,j}$, may be determined by minimizing $L_i^2$ subject to the constraint $$\left(\sum_{j=1}^{D} b_j\right) \leq b_q.$$

$b_j$ represents the number of bits allocated to dimension j, while $b_q$ represents the total number of bits in which the quantized feature vector $\hat{x}_i$ is expressed. $L_i^2$ is the square of the loss of log-likelihood ratio as defined in (4) above. The LaGrangian can thus be expressed as follows:

$$C = \sum_{j=1}^{D} \frac{\delta_{g_{i,j}}^2}{\sigma_{g_{i,j}}^4} D_j(b_j) + \lambda\left(\sum_{j=1}^{D}(b_j - b_q)\right)$$

Solving the LaGrangian by equating the first derivative with respect to the bit allocation variables to zero and using equation (4), the optimal number of bits per dimension for the selected subspace $g_{i,j}$ is as follows:

$$b_{g_{i,j}}^j = \frac{1}{D}b_q + \frac{1}{2}\left[\frac{\delta_{g_{i,j}}^2}{\sigma_{g_{i,j}}^2} - \frac{1}{D}\sum_{k=1}^{D}\log_2\left(\frac{\delta_{g_{i,k}}^2}{\sigma_{g_{i,k}}^2}\right)\right] \quad (6)$$

For multiple candidates, we instead minimize $$\sum_{m=1}^{M}(L_i^m)^2,$$

obtaining the following expression:

$$b_{g_{i,j}}^j = \frac{1}{D}b_q + \frac{1}{2}\left[\frac{\Delta_{g_{i,j}}}{\sigma_{g_{i,j}}^2} - \frac{1}{D}\sum_{k=1}^{D}\log_2\left(\frac{\Delta_{g_{i,k}}}{\sigma_{g_{i,k}}^2}\right)\right] \quad (7)$$

where M is the total number of candidates under consideration and $$\Delta_{g_{i,j}} = \frac{1}{M} \sum_{m=1}^{M} \delta_{m,g_{i,j}}^2.$$

The number of bits in a given dimension of a quantized feature vector must be an integer, as it is not possible to have fractions of a bit. However, equations (6) and (7) do not necessarily yield integers. The following algorithm may be used to convert the results of these equations into a bit allocation strategy vector 116 specifying an integer number of bits for each dimension. In the steps below, $\beta = \{b_{g_{i,1}}^1, \ldots, b_{i,D}^D\}$ denotes the BASV.

1. Calculate $\lfloor \beta \rfloor$ by rounding down each element of $\beta$. Specifically, each element is replaced with the greatest integer less than or equal to itself.

2. Determine a vector, $(\beta - \lfloor \beta \rfloor)$. It is noted that each element of this vector will be greater than or equal to zero but less than one.

3. Select the top $$b_q - \sum_{j=1}^{D} \lfloor b_{g_{i,j}}^j \rfloor$$

elements from this vector and add one bit to each element thus selected.

At calculating operation 408, a likelihood ratio is determined by dividing the likelihood that the quantized feature vector belongs to the second statistical model by the likelihood that the quantized feature vector belongs to the first statistical model. The logarithm of the likelihood ratio is also computed. After calculating operation 408 is completed, flow passes to averaging operation 410.

At averaging operation 410, the logarithms of the likelihood ratios as determined by calculating operation 408 are averaged over a predetermined number of frames. It is noted that because each frame is represented by a quantized feature vector, it suffices to simply count the desired number of feature vectors and average over this number. Mathematically, the averaging operation may be expressed as $\Lambda(\hat{X})$.

At determining operation 412, it is determined whether the average determined by averaging operation 410 exceeds a predefined classification threshold. The threshold value may be a statistically determined confidence level required to accept a hypothesis that the quantized feature vectors represent a specific candidate analog electric signal. The threshold value may be expressed as $\Theta$. Accordingly, in the event that the average equals or exceeds the threshold:

$$\Lambda(\hat{X}) \geq \Lambda$$

The hypothesis is accepted. Thus, a decision is made that the feature vectors represent a candidate analog electrical signal. Conversely, in the event that the average is less than the threshold:

$$\Lambda(\hat{X}) < \Theta$$

The hypothesis is rejected. Thus, a decision is made that the feature vectors do not represent the candidate signal.

Figure 5:
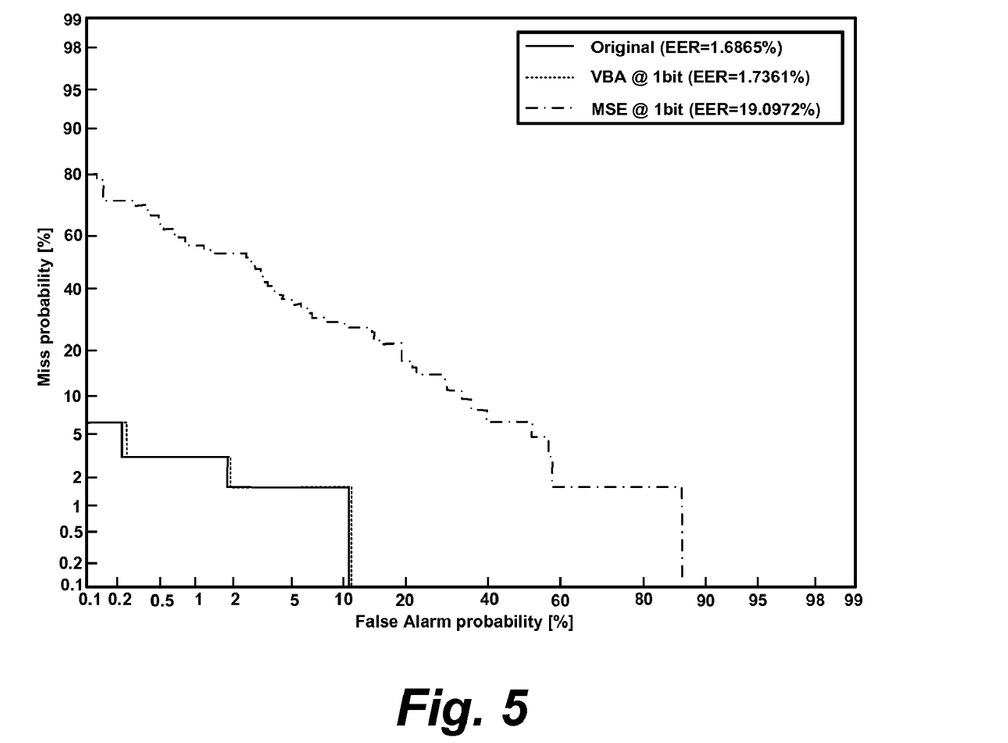
FIG. 5 shows experimental results of the present invention against conventional approaches.

FIG. 5 illustrates experimental results using the present invention on the appropriately modified state-of-the-art IBM Speaker Verification system.

The data consisted of the audio portion of the HUB4 Broadcast News Database (mono 16 kHz PCM). A subset of 64 speakers was selected as the target speaker set. A feature vector consists of 19-dimensional MFCC and their first derivatives1 with feature warping (i.e., D=38). A rate of 100 frames per second, with 50% overlap was used and the MFCC were computed over a 20 millisecond window. For each speaker, two minutes of data were set aside and used for training the final models. The UBM, trained on independent broadcast news data, contained 256 38-dimensional Gaussian components. The speaker models, being MAP-adapted from the UBM, also had 256 components. For each speaker, 30 seconds (i.e., N=3000 feature vectors) were used for testing performance.

Verification performance of the original system (unquantized features; 32 bits per feature element) was compared against two quantization methods: (i) The quantizer of the present invention with variable bit allocation, and (ii) Conventional MSE quantizer designed from the UBM model with uniform bit allocation. Note that the latter approach does not require to pick the top-scoring Gaussian before quantization. Thus, the extra $b_c=8$ bits is assigned to the best feature elements. That is, those feature elements with the highest $$\frac{\delta_{g_{i,j}}}{\sigma_{g_{i,j}}^2}$$

ratio.

Experiments were run for various rate constraints. FIG. 5 shows the single-speaker verification performance for a 1:32 compression ratio (i.e., 1 bit per dimension, on average). The quantization method of the present invention performs extremely well considering that 1 bit per feature element translates into being left/right of the corresponding Gaussian's mean. One may suspect that most dimensions are useless such that most feature elements are simply skipped, allowing non-skipped feature elements to use a relatively high number of bits.

Actually, most feature elements are indeed coded and only a few feature elements use a number of bits greater than one (maximum of 3 bits). Finally, note that the performance of the conventional MSE quantizer is poor (increases the Equal Error Rate, or EER, by more than 18%). Similar conclusions were drawn for loser rate constraints and multi-speaker verification performance.

Figure 6:
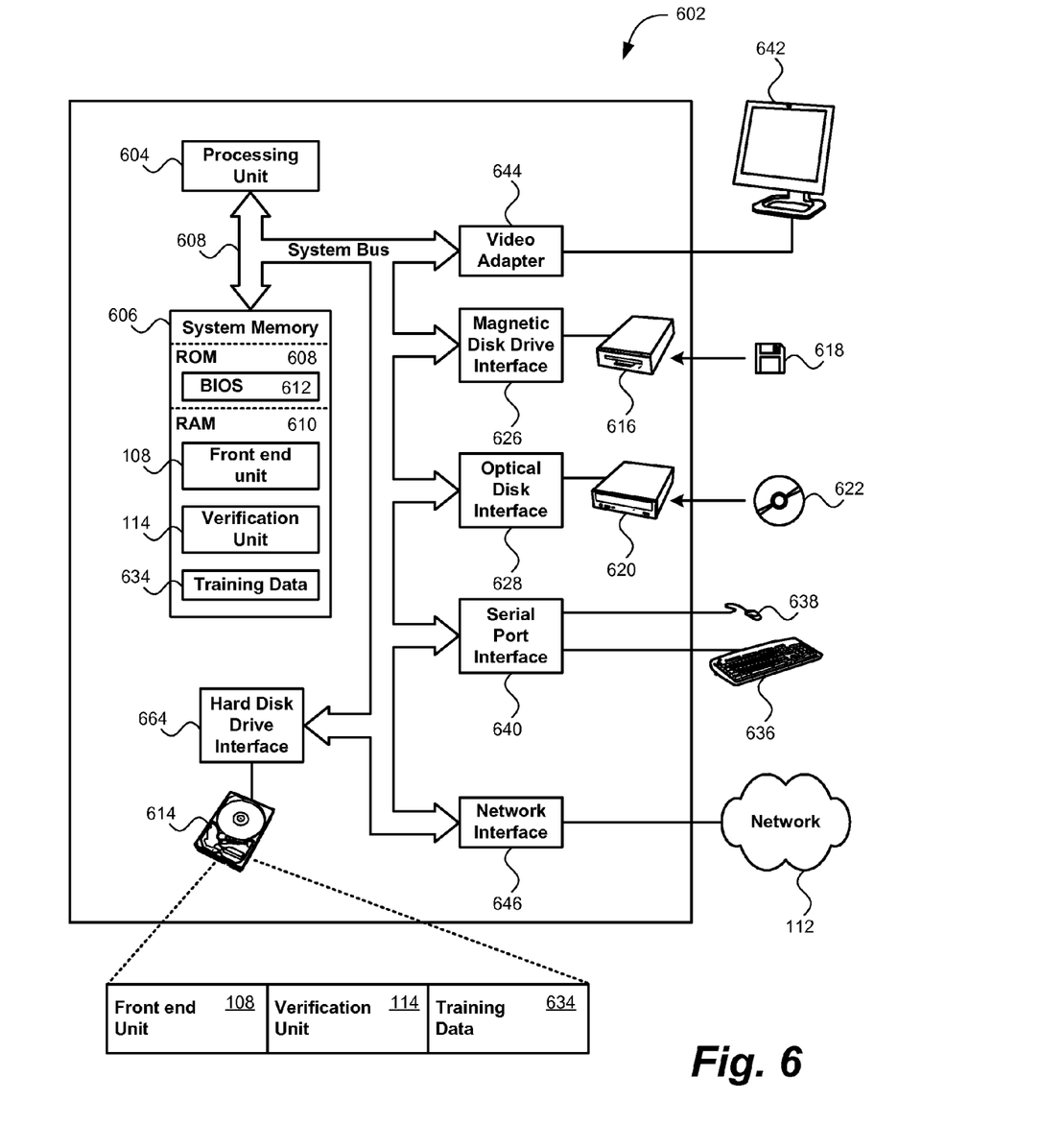
FIG. 6 shows an illustrative embodiment of a computer system in accordance with the present invention.

With reference to FIG. 6, an illustrative embodiment of a computer system 602 in accordance with the present invention is shown. One computer system 602 in which the present invention is potentially useful encompasses a general-purpose computer. Examples of such computers include SPARC (r) systems offered by Sun Microsystems, Inc. and Pentium(r) based computers available from International Business Machines Corp. and various other computer manufacturers. SPARC is a registered trademark of Sun Microsystems, Inc. and Pentium is a registered trademark of Intel Corporation.

The computer system 602 includes a processing unit 604, a system memory 606, and a system bus 608 that couples the system memory 606 to the processing unit 604. The system memory 606 includes read only memory (ROM) 608 and random access memory (RAM) 610. A basic input/output system (BIOS) 612, containing the basic routines that help to transfer information between elements within the computer 602, such as during start-up, is stored in ROM 608.

The computer system 602 further includes a hard disk drive 614, a magnetic disk drive 616 (to read from and write to a removable magnetic disk 618), and an optical disk drive 620 (for reading a CD-ROM disk 622 or to read from and write to other optical media). The hard disk drive 614, magnetic disk drive 616, and optical disk drive 620 are connected to the system bus 608 by a hard disk interface 624, a magnetic disk interface 626, and an optical disk interface 628, respectively. The drives and their associated computer-readable media provide nonvolatile storage for the computer system 602. Although computer-readable media refers to a hard disk, removable magnetic media and removable optical media, it should be appreciated by those skilled in the art that other types of media that are readable by a computer, such as flash memory cards, may also be used in the illustrative computer system 602.

A number of program modules may be stored in the drives and RAM 610, including front end unit 108, a verification unit 114, and training data 634. As discussed above, the computer system 602 is configured to classify an analog electrical signal using statistical models of training data.

A user may enter commands and information into the computer system 602 through a keyboard 636 and pointing device, such as a mouse 638. Other input devices (not shown) may include a microphone, modem, joystick, game pad, satellite dish, scanner, or the like. These and other input devices are often connected to the processing unit through a serial port interface 640 that is coupled to the system bus 608.

A display device 642 is also connected to the system bus 608 via an interface, such as a video adapter 644. In addition to the display device, the computer system 602 may include other peripheral output devices (not shown), such as speakers and printers.

The computer system 602 operates in a networked environment using logical connections to one or more remote devices. The remote device may be a server, a router, a peer device or other common network node. When used in a networking environment, the computer system 602 is typically connected to the network 648 through a network interface 646. In a network environment, program modules depicted relative to the computer system 602, or portions thereof, may be stored in one or more remote memory storage devices.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A method for classification of an analog electrical signal using statistical models of training data, the method comprising:
    converting the analog electrical signal into a sequence of feature vectors, the feature vectors being multi-dimensional;
    quantizing a feature vector on a relevant subspace of a first statistical model as a function of a second statistical model, the first statistical model generated from a first training data set and the second statistical model generated from a second training data set;
    determining a likelihood ratio by dividing the likelihood that the quantized feature vector belongs to the second statistical model by the likelihood that the quantized feature vector belongs to the first statistical model;
    determining a log-likelihood ratio by computing a logarithm of the likelihood ratio;
    averaging a series of log-likelihood ratios; and
    classifying the analog electrical signal as belonging to the second statistical model if the average of the logarithms of likelihood ratios exceeds a predefined classification threshold;
    wherein quantizing the feature vectors on the relevant subspace includes minimizing a loss in a power of the logarithm of the likelihood ratio between the original feature vector and the quantized feature vector.

2. The method of claim 1, wherein the first statistical model and the second statistical model are Gaussian mixture models.

3. The method of claim 2, wherein the subspace is a single multi-dimensional Gaussian element in the first statistical model that is the most likely to have generated the multi-dimensional feature vector.

4. The method of claim 3, wherein associating the relevant subspace includes associating an index of the Gaussian utilized for quantization of the feature vector.

5. The method of claim 1, wherein the power is two.

6. The method of claim 1, wherein quantizing the feature vectors on a relevant subspace includes:
    receiving a maximum number of bits per feature vector; and allocating a number of bits for each dimension of the feature vector by minimizing a LaGrangian cost function subject to the constraint of the received maximum number of bits per feature vector.

7. The method of claim 6, wherein the minimization is based on the second statistical model.

8. The method of claim 6, further comprising:
rounding the number of bits for each dimension of the feature vector such that each number of bits is the greatest integer less than or equal to the number of bits determined by minimizing the LaGrangian cost function;
counting the difference between the total number of bits across all dimensions of the feature vector yielded by the rounding operation and the received maximum number of bits; and
iteratively adding one bit to each dimension, in decreasing order of the fractional number of bits removed by the rounding operation, until the number of bits yielded by the determining operation have been reallocated.

9. The method of claim 1, further comprising converting acoustical energy into the analog electrical signal through a transducer.

10. The method of claim 1, further comprising converting optical energy into the analog electrical signal through a optical transducer.

11. A system for classification of an analog electrical signal using statistical models of training data, the system comprising:
a microphone configured to convert acoustical energy to the analog electrical signal;
an extraction unit configured to convert the analog electrical signal into a sequence of feature vectors, the feature vectors being multi-dimensional;
a scoring unit configured to determine a relevant subspace from a first statistical model based on maximum likelihood that the subspace accurately represents the feature vector;
a quantizing unit configured to quantize the feature vector according to the relevant subspace and a bit allocation strategy vector;
a calculating unit configured to compute the likelihood ratio by dividing the likelihood that the quantized feature vector belongs to the second statistical model by the likelihood that the quantized feature vector belongs to the first statistical model and to further compute the logarithm of the likelihood ratio; and
a determining unit configured to average the logarithms of the likelihood ratios of a predetermined number of frames and to further determine whether the resulting average exceeds a predefined classification threshold;
wherein the quantizing unit is further configured to minimize a loss in a power of the logarithm of the likelihood ratio between the original feature vector and the quantized feature vector.

12. The system of claim 11, further comprising a bit allocation unit configured to allocate a number of bits for each dimension of the feature vector by minimizing a LaGrangian cost function subject to the constraint of a predefined maximum number of bits per feature vector.

13. The system of claim 12, wherein the minimization is based on the second statistical model.

14. The system of claim 11, further comprising a lookup unit configured to store and retrieve pre-computed values of the logarithms of the likelihood ratios.

15. The system of claim 11, wherein the power is two.

16. A computer program product embodied on a non-transitory computer readable medium comprising:
computer readable program codes coupled to the non-transitory computer readable medium for classifying an analog electrical signal using statistical models of training data, the computer readable program codes configured to cause the program to:
convert the analog electrical signal into a sequence of feature vectors, the feature vectors being multi-dimensional;
quantize a feature vector on a relevant subspace of a first statistical model as a function of a second statistical model, the first statistical model generated from a first training data set and the second statistical model generated from a second training data set;
determine a likelihood ratio by dividing the likelihood that the quantized feature vector belongs to the second statistical model by the likelihood that the quantized feature vector belongs to the first statistical model and to further compute the logarithm of this value;
determine a log-likelihood ratio by computing a logarithm of the likelihood ratio;
average a series of log-likelihood ratios thus determined; and
classify the analog electrical signal as belonging to the second statistical model if the average of the logarithms of likelihood ratios exceeds a predefined classification threshold;
wherein the computer readable program codes configured to quantize the feature vectors further comprise computer readable program codes configured to minimize a loss in a power of the logarithm of the likelihood ratio between the original feature vector and the quantized feature vector.

17. The computer program product of claim 16, wherein the first statistical model and the second statistical model are Gaussian mixture models.

18. The computer program product of claim 17, wherein the subspace is a single multi-dimensional Gaussian element in the first statistical model that is the most likely to have generated the multi-dimensional feature vector.

19. The computer program product of claim 18, wherein the computer readable program codes configured to associate the relevant subspace further comprise computer readable program codes configured to associate an index of the Gaussian utilized for quantization of the feature vector.

20. The computer program product of claim 16, wherein the power is two.

* * * * *